(12) United States Patent
Keller

(10) Patent No.: US 8,490,902 B2
(45) Date of Patent: Jul. 23, 2013

(54) METHOD OF DETECTING THE ABSENCE OF COFFEE BEANS IN A COFFEE GRINDER OF A COFFEE MACHINE AND COFFEE MAKER FOR PERFORMING THE METHOD

(75) Inventor: Peter Keller, Bauma (CH)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 13/326,394

(22) Filed: Dec. 15, 2011

(65) Prior Publication Data

US 2012/0132735 A1 May 31, 2012

Related U.S. Application Data

(62) Division of application No. 11/369,459, filed on Mar. 7, 2006, now Pat. No. 8,096,229.

(30) Foreign Application Priority Data

Mar. 29, 2005 (CH) ........................................ 0533/05

(51) Int. Cl.
*B02C 25/00* (2006.01)
*B02C 21/00* (2006.01)

(52) U.S. Cl.
USPC .................................. 241/30; 241/33; 241/36

(58) Field of Classification Search
USPC .......................................... 241/30, 33, 35–36
See application file for complete search history.

(56) References Cited

U.S. PATENT DOCUMENTS

| 3,825,231 A | 7/1974 | McFarland |
| 3,987,715 A | 10/1976 | Muller |
| 4,007,675 A | 2/1977 | Cailliot et al. |
| 4,336,433 A | 6/1982 | Yokozeki |
| 4,672,181 A | 6/1987 | Sakamoto et al. |
| 4,787,299 A | 11/1988 | Levi et al. |
| 4,789,106 A | 12/1988 | Weber |
| 4,833,978 A | 5/1989 | Martone et al. |
| 5,186,399 A | 2/1993 | Knepler et al. |
| 5,201,474 A | 4/1993 | Midden |
| 5,307,733 A | 5/1994 | Enomoto |
| 5,386,944 A | 2/1995 | Knepler et al. |
| 5,412,675 A | 5/1995 | Odagawa |
| 5,463,932 A | 11/1995 | Olson |
| 5,511,465 A | 4/1996 | Friedrich et al. |
| 5,522,556 A | 6/1996 | Knepler et al. |
| 5,660,336 A | 8/1997 | Joseph, Jr. et al. |
| 5,836,236 A | 11/1998 | Rolfes et al. |
| 5,862,738 A | 1/1999 | Warne |
| 5,992,299 A | 11/1999 | Fong |
| 6,238,721 B1 | 5/2001 | Knepler |

(Continued)

FOREIGN PATENT DOCUMENTS

| EP | 0676162 A1 | 10/1995 |
| EP | 1440641 A1 | 7/2004 |
| JP | 64086921 | 9/1987 |
| JP | 05300837 A | 11/1993 |
| JP | 7204096 A | 8/1995 |
| JP | 8107826 A | 4/1996 |
| JP | 2000051101 A | 2/2000 |

*Primary Examiner* — Faye Francis

(57) ABSTRACT

In order to detect a lack of coffee beans in a grinder unit of a coffee maker, a method is suggested in which the level and/or the spectrum of an oscillation generated by the grinder unit during its operation is measured. The level of the oscillation and/or the nature of the spectrum are used to decide whether or not coffee beans are present in the grinder unit. Preferably, the level of oscillation of the housing of the coffee grinder unit is monitored. If the level changes by more than a preset value and/or falls below a reference value, it is decided that coffee beans are lacking.

20 Claims, 1 Drawing Sheet

U.S. PATENT DOCUMENTS

| | | |
|---|---|---|
| 6,260,479 B1 | 7/2001 | Friedrich et al. |
| 6,572,036 B2 | 6/2003 | Glucksman et al. |
| 7,323,005 B2 | 1/2008 | Wallace et al. |
| 7,350,455 B2 | 4/2008 | Vetterli |
| 2005/0279219 A1 | 12/2005 | Turi |
| 2006/0057939 A1 | 3/2006 | Yui et al. |
| 2008/0202345 A1 | 8/2008 | Delonghi |
| 2009/0293733 A1 | 12/2009 | Martin et al. |

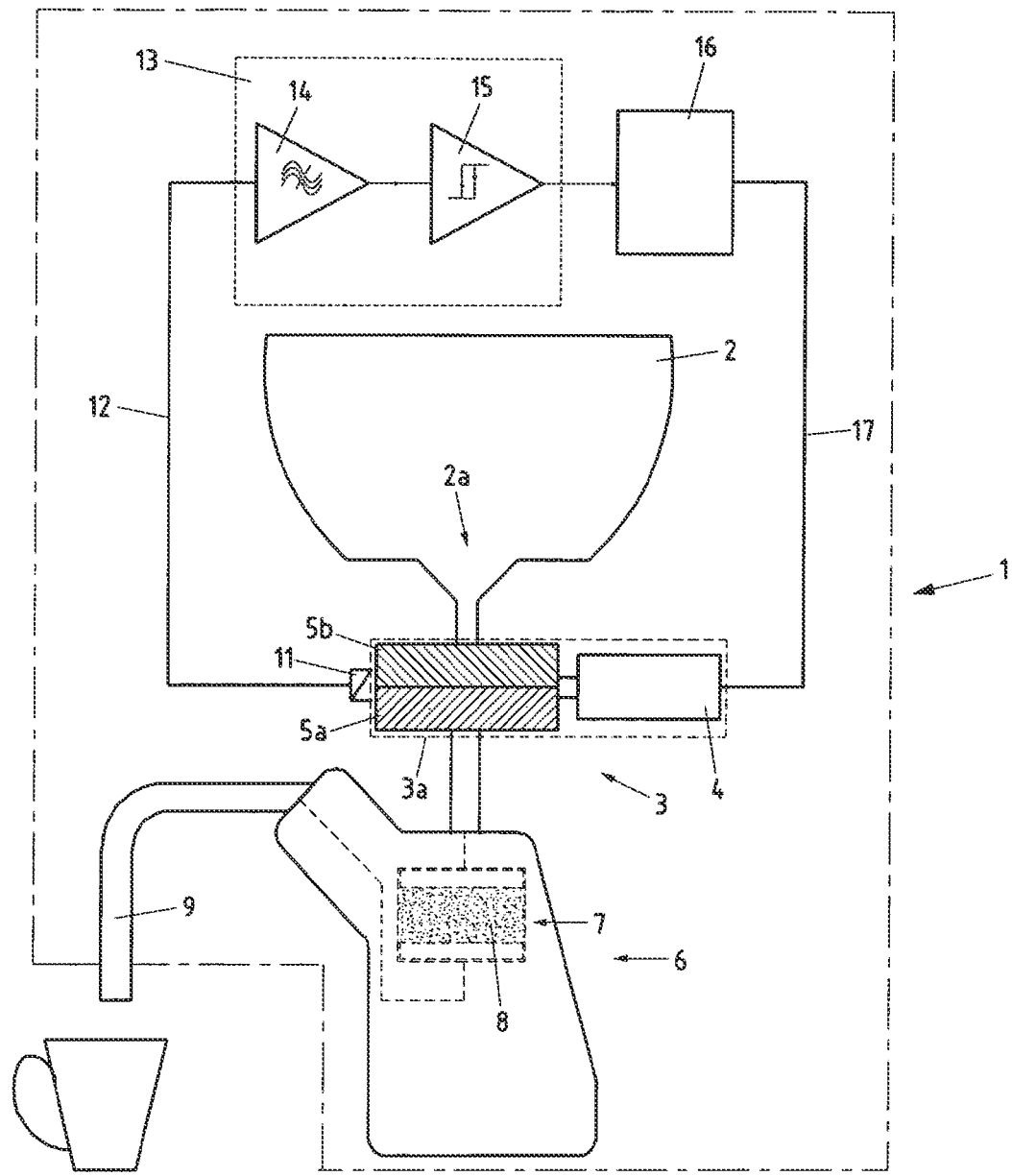

METHOD OF DETECTING THE ABSENCE OF COFFEE BEANS IN A COFFEE GRINDER OF A COFFEE MACHINE AND COFFEE MAKER FOR PERFORMING THE METHOD

CROSS-REFERENCE TO RELATED APPLICATIONS

This is a divisional application of prior U.S. patent application Ser. No. 11/369,459, filed Mar. 7, 2006, and issued as U.S. Pat. No. 8,096,229 on Jan. 17, 2012, which is incorporated by reference herein.

BACKGROUND OF THE INVENTION

1. Field of the Invention

Coffee makers of the kind referred to herein are adapted to prepare a fresh coffee beverage fully automatically. Such coffee makers comprise a coffee bean container for receiving coffee beans to be ground, a grinder unit for grinding the coffee beans into ground coffee powder, and a brewing unit to which the freshly ground coffee powder is fed. In the brewing unit, the coffee powder is compressed and, thereafter, hot pressurized brewing water flows through the compressed coffee powder to extract a coffee beverage. Such coffee makers are also called "Espresso Coffee Machines" in general language use.

There is one particular problem in connection with these coffee makers, inasmuch as a lack of coffee beans in the grinder unit should be detected as soon as possible; otherwise, the drive motor of the grinder unit could overheat if it runs under no load conditions for a certain period of time. Another problem is seen in the fact that a relationship should be established to the amount of coffee beans already ground in the actual grinding cycle once the lack of coffee beans has been detected; thereby, after refilling the coffee bean container with coffee beans, the grinding cycle can be continued to grind only the remaining amount of coffee beans required to complement the already ground amount such that the correct total amount of coffee powder results that is required to brew a proper coffee beverage. Otherwise, the already ground amount of coffee would have to be discarded without having been used and replaced by a new, full charge of coffee powder.

2. Description of the Related Art

The detection of a lack of coffee beans in a grinder unit of a coffee maker by means of conventional sensing means is problematic, since these are subject to rapid contamination, the more so as coffee beans are fatty and because coffee dust develops during the grinding operation, that dust being destructive for most of the sensing means used up to now.

Moreover, it is known in the prior art to measure the current the electric motor driving the grinding unit draws and to conclude from the magnitude of the current to the presence or absence of coffee beans in the grinder unit. Such a method may be theoretically possible since the motor of the grinder unit draws more current under load than during operating in a no-load condition. However, this method did not prove its reliability in practice because, in most cases, a gearbox is arranged between motor and grinder unit, hampering the detection of a lack of coffee beans because, due to the high reduction ratio of the gearbox, only a small difference in current draw can be observed when the motor is operated under load and under no-load conditions, respectively.

A further problem is presented by the fact that certain components of the grinder unit run in over the months and years, resulting in a continuous reduction of the current draw of the motor; thus, the detection of a lack of coffee beans by means of measuring the current is additionally complicated and hampered, respectively.

Finally, further parameters as, for instance, the ambient temperature, the ambient humidity, the kind, size and degree of roasting of the coffee beans to be ground, the selected degree of grinding as well as changes and wear of the grinder unit due to aging can have an influence on the current draw and, thereby, on the validity of the measurement.

SUMMARY OF THE INVENTION

It is an object of the present invention to provide a method of detecting a lack of coffee beans in a coffee bean grinder unit of a coffee maker that is substantially independent of changing or adjustable parameters of the grinder unit, further that can be easily realized and that delivers a reliable indication of a lack of coffee beans. It is a further object of the invention to provide a coffee maker, using the method of the invention, in which the means required to reliably detect a lack of coffee beans in the grinder unit are cost efficient and simple in the practical application.

To meet these and other objects, the present invention provides, according to a first aspect, a method of detecting a lack of coffee beans in a coffee bean grinder unit. The method comprises the steps of measuring the level and/or the spectrum of an oscillation generated by the coffee bean grinder unit during its operation, and deciding whether or not coffee beans are present in the coffee bean grinder unit in dependence of the magnitude of the measured level and/or the nature of the measured spectrum of the oscillation. The grinding operation is interrupted if it is decided that no coffee beans are present in the coffee bean grinder unit.

According to a second aspect, the invention provides a coffee maker adapted to use the method described herein above. It comprises a coffee bean container, a grinder unit adapted to grind coffee beans, a brewing unit having a brewing chamber for extracting the ground coffee beans by means of hot, pressurized brewing water, and at least one sensor means for recording the level and/or the spectrum of the oscillation generated by the grinder unit during the operation of the grinder unit.

Thus, the fundamental idea of the invention consists in measuring the level and/or the spectrum of an oscillation generated by the grinder unit during its operation, and to decide on the basis of the measurement results whether beans are still present in the grinder unit or whether the latter one operates without load, i.e., without containing any coffee beans to be ground. Anyway, it has been shown that it is basically possible to detect the presence or lack of coffee beans in the grinder unit both on the basis of the measured level of oscillations and the measured nature of the spectrum of these oscillations.

In a preferred embodiment, the level of the oscillations is continuously recorded and the operation of the grinder unit is stopped if the measured level changes by more than a preset value or if it falls below a reference value. Thereby, particularly, advantage is taken of the fact that the level of oscillations is substantially higher during a grinding operation than during an operation of the grinder unit under no load conditions.

BRIEF DESCRIPTION OF THE DRAWINGS

A preferred embodiment of the method and of the coffee maker according to the invention will be further described in the following, with reference to the sole drawing, showing a strictly schematic illustration of a coffee maker.

DESCRIPTION OF THE PREFERRED EMBODIMENT

The coffee maker 1 schematically shown in the drawing comprises a coffee bean container 2, a coffee grinder 3, a brewing assembly 6, a beverage outlet 9, a sensor 11, an electronic monitoring and analyzing unit 13 as well as an electronic control unit 16. The coffee grinder 3 comprises an electric motor 4, driving, by means of a reduction gearbox (not shown), at least one of two grinding wheels 5a, 5b. The coffee grinder 3 is located below the coffee bean container 2 and communicates with the coffee bean container 2 by means of a passage 2a.

A sensor 11 is attached to the housing 3a of the coffee grinder 3 and connected to the electronic monitoring and analyzing unit 13 by means of a conductor 12. The electronic monitoring and analyzing unit 13 itself is connected to the electronic control unit 16, and the latter one is connected to the coffee grinder 3 by means of a control conductor 17.

The brewing assembly 6 comprises a brewing chamber 7, serving for extracting the coffee and coffee powder 8, respectively, ground by the coffee grinder 3. The coffee powder 8 received in the brewing chamber 7 is compressed by means of a not shown piston and, thereafter, extracted by the brewing water fed into the brewing chamber 7 under pressure. The coffee beverage prepared in the brewing assembly 6 can flow through the beverage outlet 9 into a coffee cup put below the latter one.

Out of the two grinding wheels 5a, 5b, preferably only the grinding wheel 5a is driven by the electric motor 4, while the other grinding wheel is stationary and attached in a torque-proof manner to the housing 3a of the coffee grinder 3.

The sensor 11 attached to the housing 3a of the coffee grinder 3 is adapted to record a vibration or oscillation level, or a vibration or oscillation spectrum generated by the coffee grinder 3 during its operation. The present invention takes advantage of the fact that the coffee grinder 3 generates vibration or oscillations during its operation, the spectrum and particularly the level thereof distinctively changing depending on whether coffee beans are ground in the coffee grinder 3 or the coffee grinder runs without having any coffee beans to be ground in it, i.e., in a no-load condition.

For monitoring the vibration or oscillations, it has proven to be advantageous to attach the sensor 11 to the housing 3a of the coffee grinder 3 or to a housing portion thereof. With a sensor 11 attached in this way, the vibration or oscillations of the housing 3a, excited by the operation of the electric motor 4 driving at least one of the two grinding wheels 5a, 5b, can be easily detected and, subsequently, electronically interpreted by the electronic monitoring and analyzing unit 13. Thereby, the electronic monitoring and analyzing unit 13 comprises a filter and amplifier circuitry 14 provided with a low-pass filter as well as a threshold value switching circuitry 15. The threshold value switching circuitry 15 can be realized, for instance, by a comparator, comparing the measured value with a reference value and producing an output signal to the electronic control unit 16 as soon as the measurement value exceeds the reference value or falls below the reference value. In the case when a decision has to be take regarding beans are present in the coffee bean container 2, or
the coffee bean container 2 does not contain any beans,
on the basis of the measured vibration or oscillation level, the filter/amplifier circuitry 14 is preferably designed such that short peak-like level changes are not interpreted as lack of beans. Test measurements made with different existing coffee grinding units resulted in the fact that the vibration/oscillation level of the housing 3a of the grinding unit, depending on the design of the grinding unit and the boundary conditions, is different by a factor between 2 and 40 in the two operating conditions discussed here, i.e., the grinding unit is operated under load and grinds coffee beans, and the grinding unit is operated without load, i.e., it runs, but no beans are ground. Particularly, the level of vibration/oscillation is, under worst case conditions, twice as high when coffee beans are ground than when the grinding unit runs without load.

Using a piezo-electric sensor 11, directly attached to the housing 3a of the grinder 3, differences of the level of vibration/oscillation up to a factor of 15 have been measured in the two operation modes, i.e., grinding beans (under load operation) or no-load operation (no beans present to be ground).

Moreover, by setting a second threshold value, a blocking of the grinding unit can be detected.

As soon as the electronic monitoring and analyzing unit 13 recognizes a lack of coffee beans in the grinder unit 3, a corresponding signal is sent to the control unit 16 which in turn stops the electric motor 4 of the grinder unit 3. Simultaneously, on a display (not shown) of the coffee maker, a notice appears that the coffee bean container 2 is empty and needs refill.

Instead of monitoring and analyzing the level of vibration or oscillation of the housing 3a of the grinder unit 3, also the spectrum of vibration/oscillations of the housing 3a of the grinder unit 3 can be recorded and processed by means of the subsequent monitoring and analyzing unit 13. Test have shown that the vibration spectrum and the vibration frequency, respectively, of the housing 3a of the grinder unit 3 changes distinctively between operating the grinding unit 3 under load and operating it in a no-load condition, i.e., without coffee beans to be ground. Particularly, the vibration spectrum and the vibration frequency, respectively, of the housing 3a of the grinder unit 3 is lower by as much as 50% under no-load condition. It is understood that both parameters, i.e., the level of vibration and the spectrum of vibration, can be used simultaneously for detecting a lack of coffee beans in the grinder unit 3.

Instead of a piezo-electric sensor, an inductive or a capacitive sensor could be used. Also the provision of one or more strain gauge(s) is possible, taking the function of the sensor. A further possibility is the provision of a microphone recording the airborne sound or the impact sound of the housing 3a of the grinder unit 3.

Preferably, the vibration or oscillation of the housing 3a of the grinder unit 3 is measured and processed only during an actual grinding cycle. By detecting or measuring what amount of coffee beans prior to stopping the grinder unit 3 has been ground, in other words, what amount of beans has been ground between the start of the grinder unit 3 and the moment when it was detected that it runs in a no-load condition, the grinding operation can be continued, after the coffee bean container 2 having been refilled, until the desired total amount of coffee beans has been ground. This presents the advantage that the already ground amount of coffee beans can still be used for preparing the coffee beverage. Measuring the amount of coffee beans ground prior to stopping the grinder due to the lack of beans in the coffee bean container 2 can be accomplished, for example, by measuring the number of revolutions of the coffee grinder 3 between the start of the grinding operation and the stop of the motor 4 under the influence of the control unit 16 due to lack of beans.

Monitoring and analyzing the vibrations/oscillations of the housing 3a of the grinder unit 3 preferably is started simultaneously with the grinding operation and also stopped therewith or shortly before.

The method and the coffee maker according to the present invention present the following advantages:
- Cost efficient and simple design;
- Quick detection of a lack of beans;
- No run-in time of the grinding unit necessary;
- Useable with almost any type of grinder unit;
- Changes of the behavior of the grinder unit due to aging do not have a substantial influence on the measured result;
- Substantially temperature independent operation;
- Substantially friction independent operation;
- Measured result substantially independent of the size, kind and degree of roasting of the coffee beans;
- Substantially humidity independent operation;
- Galvanic separation between sensor and grinder unit; and
- The grinding operation can be continued, after the coffee bean container having been refilled, up to the desired amount of ground coffee.

The invention claimed is:

1. A method of detecting a lack of coffee beans in a coffee bean grinder unit, comprising the acts of:
measuring a level of an oscillation generated by the coffee bean grinder unit during operation of the coffee bean grinder; and
deciding whether or not coffee beans are present in the coffee bean grinder unit based on said measured level of the oscillation.

2. The method according to claim 1, further comprising the act of interrupting the operation of the coffee bean grinder in response to a result of the deciding act indicating that no coffee beans are present in the coffee bean grinder unit.

3. The method according to claim 1, further comprising the acts of:
measuring a span of time from a start of the operation of the coffee bean grinder to a detection of a lack of coffee beans in the coffee bean grinder unit; and
continuing the operation of the coffee bean grinder once coffee beans have been added to the coffee bean grinder unit.

4. The method according to claim 1, further comprising the act of comparing the measured level of the oscillation with a reference value for recognizing a lack of coffee beans.

5. The method according to claim 1, wherein the deciding act determines that coffee beans are lacking in the coffee bean grinder if the measured level changes by more than a preset value or if the measured level falls below a reference value.

6. The method according to claim 1, wherein the measuring act measures a magnitude of oscillation of a housing of the grinder unit or a magnitude of oscillation of an element attached to the grinder unit.

7. A method of detecting a lack of coffee beans in a coffee bean grinder unit, comprising the acts of:
measuring a spectrum of an oscillation generated by the coffee bean grinder unit during operation of the coffee bean grinder; and
deciding whether or not coffee beans are present in the coffee bean grinder unit in based on said measured spectrum of the oscillation.

8. The method according to claim 7, wherein the deciding act determines that coffee beans are lacking in the coffee bean grinder if the spectrum changes by more than a preset value or if the spectrum reaches a reference value.

9. The method according to claim 7, wherein the measuring act measures a spectrum of oscillation of a housing of the grinder unit or a spectrum of oscillation of an element attached to the grinder unit.

10. The method according to claim 7, further comprising the act of interrupting the operation of the coffee bean grinder in response to a result of the deciding act indicating that no coffee beans are present in the coffee bean grinder unit.

11. The method according to claim 7, further comprising the acts of:
measuring a span of time from a start of the operation of the coffee bean grinder to a detection of a lack of coffee beans in the coffee bean grinder unit; and
continuing the operation of the coffee bean grinder once coffee beans have been added to the coffee bean grinder unit.

12. A method of detecting a lack of coffee beans in a coffee bean grinder unit, comprising the acts of:
measuring a level and a spectrum of an oscillation generated by the coffee bean grinder unit during operation of the coffee bean grinder; and
deciding whether or not coffee beans are present in the coffee bean grinder unit in based on said measured level and said measured spectrum of the oscillation.

13. The method according to claim 12, wherein the measuring act measures a magnitude of oscillation and a spectrum of oscillation of a housing of the grinder unit or magnitude of oscillation and a spectrum of oscillation of an element attached to the grinder unit.

14. The method according to claim 12, further comprising the act of interrupting the operation of the coffee bean grinder in response to a result of the deciding act indicating that no coffee beans are present in the coffee bean grinder unit.

15. The method according to claim 12, further comprising the acts of:
measuring a span of time from a start of the operation of the coffee bean grinder to a detection of a lack of coffee beans in the coffee bean grinder unit; and
continuing the operation of the coffee bean grinder once coffee beans have been added to the coffee bean grinder unit.

16. The method according to claim 12, further comprising the act of comparing the measured level of the oscillation with a reference value for recognizing a lack of coffee beans.

17. The method according to claim 12, wherein the deciding act determines that coffee beans are lacking in the coffee bean grinder if the measured level changes by more than a preset value or if the measured level falls below a reference value.

18. The method according to claim 12, wherein the deciding act determines that that coffee beans are lacking in the coffee bean grinder if the spectrum changes by more than a preset value or if the spectrum reaches a reference value.

19. The method according to claim 12, wherein the measuring act measures a magnitude of oscillation of a housing of the grinder unit or a magnitude of oscillation of an element attached to the grinder unit.

20. The method according to claim 12, wherein the measuring act measures a spectrum of oscillation of a housing of the grinder unit or a spectrum of oscillation of an element attached to the grinder unit.

* * * * *